(12) United States Patent
Erharter et al.

(10) Patent No.: US 11,142,220 B2
(45) Date of Patent: Oct. 12, 2021

(54) CABLE TRANSPORTATION SYSTEM

(71) Applicant: LEITNER S.P.A., Vipiteno (IT)

(72) Inventors: Nikolaus Erharter, San Candido (IT); Hartmut Wieser, Racines (IT); Giuseppe Conte, Bolzano (IT)

(73) Assignee: LEITNER S.P.A., Vipiteno (IT)

(*) Notice: Subject to any disclaimer, the term of this patent is extended or adjusted under 35 U.S.C. 154(b) by 336 days.

(21) Appl. No.: 16/437,938

(22) Filed: Jun. 11, 2019

(65) Prior Publication Data

US 2019/0375432 A1    Dec. 12, 2019

(30) Foreign Application Priority Data

Jun. 12, 2018 (IT) .................. 102018000006234

(51) Int. Cl.
| | | |
|---|---|---|
| *B61B 7/06* | (2006.01) | |
| *B60L 13/00* | (2006.01) | |
| *B61B 12/02* | (2006.01) | |

(52) U.S. Cl.
CPC .............. *B61B 7/06* (2013.01); *B60L 13/006* (2013.01); *B61B 12/02* (2013.01)

(58) Field of Classification Search
CPC .......... B61B 7/06; B61B 12/02; B60L 13/006
See application file for complete search history.

(56) References Cited

U.S. PATENT DOCUMENTS

| | | | | |
|---|---|---|---|---|
| 2011/0022252 A1* | 1/2011 | Dueck | ...................... | B61B 1/00 701/19 |
| 2013/0054057 A1* | 2/2013 | Sonnerer | ................ | H02K 11/21 701/19 |
| 2014/0305331 A1* | 10/2014 | Bavaresco | ................ | B61B 9/00 104/173.1 |
| 2017/0050646 A1* | 2/2017 | Blengini | ................ | B61B 12/022 |
| 2019/0375432 A1* | 12/2019 | Erharter | ................... | B61B 12/02 |
| 2019/0375433 A1* | 12/2019 | Erharter | ................... | B61B 7/02 |
| 2020/0039537 A1* | 2/2020 | Wieser | ................... | B61B 7/02 |
| 2020/0239034 A1* | 7/2020 | Erharter | .................. | B61B 12/06 |
| 2020/0324796 A1* | 10/2020 | Erharter | ................ | B61B 12/026 |
| 2020/0385029 A1* | 12/2020 | Erharter | ................... | B61B 7/00 |
| 2021/0031811 A1* | 2/2021 | Erharter | ..................... | B61B 7/06 |

FOREIGN PATENT DOCUMENTS

| | | |
|---|---|---|
| DE | 24 47 118 | 4/1975 |
| JP | H05 131920 | 5/1993 |
| WO | WO 2011/161333 | 12/2011 |
| WO | WO 2015/077806 | 6/2015 |
| WO | WO 2015/166357 | 11/2015 |

OTHER PUBLICATIONS

Italian Search Report for Italian Application No. IT 2018000006234 dated Feb. 5, 2019.

* cited by examiner

*Primary Examiner* — Jason C Smith
(74) *Attorney, Agent, or Firm* — Neal, Gerber & Eisenberg LLP

(57) ABSTRACT

A cable transportation system without a hauling cable and comprising: a plurality of transporting units; two supporting cables for supporting the transporting units in a suspended configuration; a plurality of trolleys, wherein each trolley supports a transporting unit in a suspended configuration and comprises rolls configured for resting and rolling on the supporting cables and at least one electric motor configured for moving the trolley along the supporting cables.

9 Claims, 5 Drawing Sheets

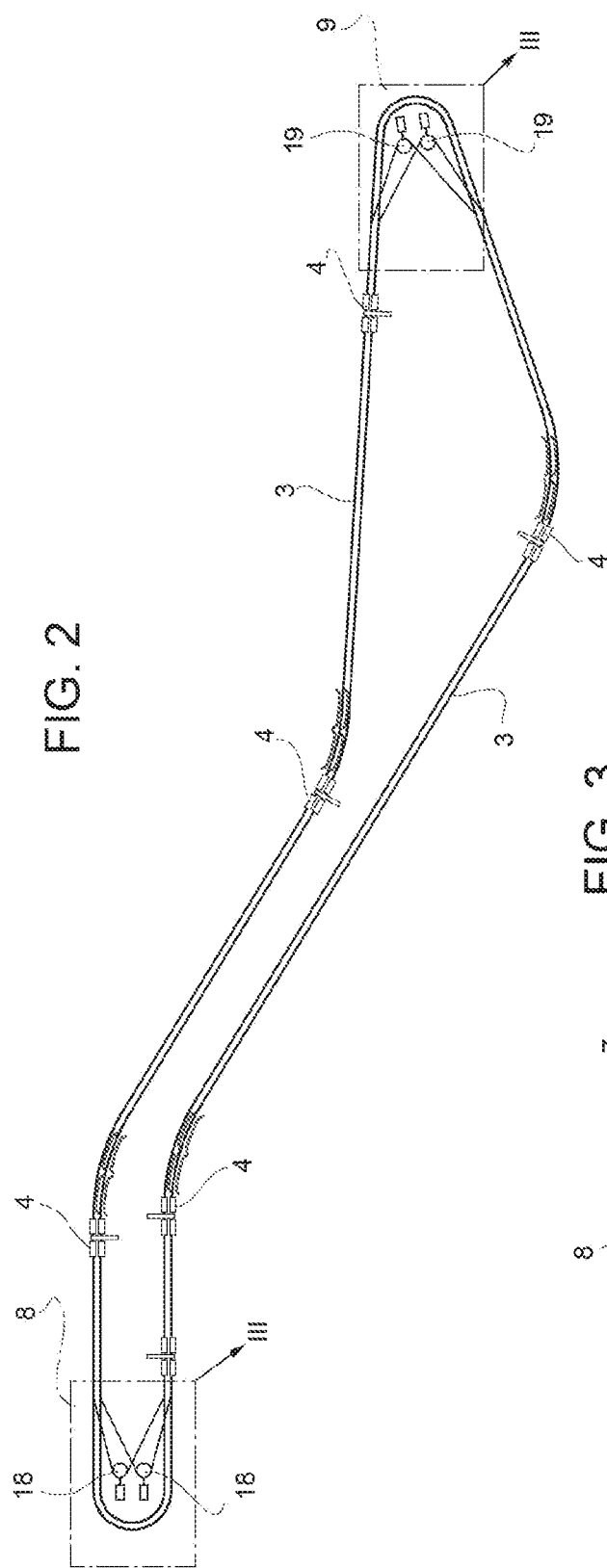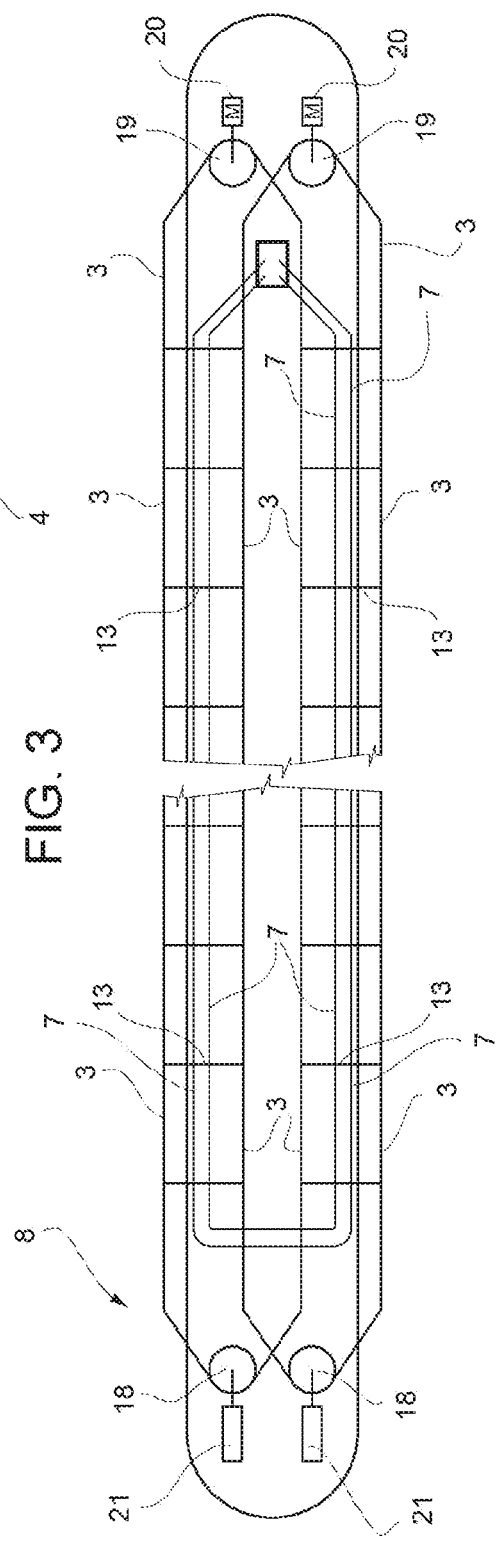

CABLE TRANSPORTATION SYSTEM

PRIORITY CLAIM

This application claims the benefit of and priority to Italian Patent Application No. 102018000006234, filed on Jun. 12, 2018, the entire contents of which are incorporated by reference herein.

TECHNICAL FIELD

The technical field of the present disclosure is that of cable transportation systems. In particular, the technical field of the present disclosure relates to a cable transportation system provided with two supporting cables for supporting a plurality of transporting units suspended from the ground and moved along the route defined by the cables themselves. In detail, each transporting unit is connected through a suspending arm to a respective trolley provided with rolls resting and sliding on the supporting cables. Therefore, the term "suspended" means that the transporting units do not rest on a lower structure, in contrast to the technical field of transportation systems wherein the transporting units are supported by resting on a lower guide. However, the technical field of the present disclosure also encompasses transportation systems that can be defined as hybrid systems (i.e., systems in which a cable transportation portion, as described above, and a rail transportation portion follow one another without transportation interruption). The expression "without transportation interruption" means that passengers do not have to get off the transporting unit at the end of the cable transportation section and onto another transporting unit in order to travel on the rail transportation section. However, "without transportation interruption" does not mean that the transporting units may not be stopped at stations located along the route.

BACKGROUND

Transportation systems in which people or things are transported along a route inside transporting units fed one after the other along a guide are widely used. In particular, such transporting units are moved in a raised configuration with respect to the ground level. The raised configuration with respect to the ground level is often advantageous, for example when the conformation of the underlying ground or other boundary factors do not make the alternative motion practicable, the alternative motion referring to transporting units, such as for example train carriages, that travel resting on guides which in turn are more or less directly laid on the ground.

Transportation systems with transporting units moved suspended and raised from the ground level can be divided into two different types depending on the morphology of the route to be followed. Each type of transportation system has peculiarities that are relatively better suited to different boundary conditions.

A first type of transportation system is a system wherein the route comprises relatively major elevation changes, even with relatively considerable slopes, and a substantially rectilinear layout. Such a route is typical of ski lifts in ski/mountain resort areas. The transportation systems used in such conditions are cable systems (i.e., systems in which the support guide for the transporting units comprises at least one supporting cable). Moreover, considering the slopes, the motion is also delegated to a cable, known as the hauling cable. To maximize the capacity of the cable system, it is known to use systems comprising two supporting cables and one hauling cable. In this configuration, it is possible to use a support trolley capable of supporting relatively sizeable cabins. Such a trolley is equipped with rolls for rolling on the supporting cables and with a clamp for selective coupling to the hauling cable.

The second type of transportation system implies substantially flat routes (that is, without elevation changes) with a plurality of curves in plan. These systems can be defined as urban because it is precisely in urban centers that there is the need to design these raised routes with respect to the already unfortunately sufficiently congested road traffic. In such routes, the support guide of the transporting units is usually a rail guide. As the slopes in this route are absent or of little relevance, the advance of the transporting units can disregard the presence of the hauling cable and be delegated to a motorized support trolley.

Systems definable as "hybrid" include sections of the route with relatively high slopes but straight in plan, which would be suitable for cable transportation, followed by sections of the route characterized by the absence of differences in level but with relatively considerable curves in plan, the latter sections being suitable for rail transportation. In these cases, it is known to provide two different systems one after the other in which, even in the presence of a shared intermediate interchange station, users are required to change transporting units to pass from one system to the other. Even if the systems are adjacent, there is still a relative inconvenience for passengers due to the transfer from one system to the other. An alternative solution known today does not require passengers to change units when passing from one section of the system to the other. For instance, PCT Patent Application No. WO2015/077806 describes a transportation system wherein the transporting units travel without transportation interruption along the route in which cable transportation portions and rail transportation portions follow one another. According to PCT Patent Application No. WO2015/077806, the transporting units, for cabins, comprise, externally to the roof, a frame constrained to a trolley supported by the supporting cables. The exchange from a cable route portion to a rail route portion takes place in the station where the transporting units are already usually released from the cables and advance supported by special upper rails in a suspended position. Before leaving the station, the trolley of the transporting units couples to a second motor or motorized trolley resting on these upper rails. Therefore, in this configuration, the transporting units are supported by the rail and hanging in mid-air, with their trolley coupled to the motorized trolley. As a result of the motorization of the motor trolley, the transporting units move along the rails and travel (always uplifted) over a rail route section.

The arrangement in rail systems of an electric motorized trolley (i.e., comprising at least one electric motor for driving the rolls), is a relatively known technology. The flatness of the route and the possibility of transferring current to the trolley make this technology usable in a relatively simple way. That is, electricity can be supplied by direct passage of current along the metal tracks that form the guide, or by providing special cables fastened to the fixed structure of the track.

Starting from this known technique, there is a need to provide cable transportation systems even in urban areas (i.e., in the presence of routes without elevation changes and with curves in plan). Specifically, these cable transportation systems allow relatively very long spans and consequently require a relatively low number of masts. Such a relatively low number means a lower number of masts than that required by traditional viaducts for rail transportation systems. Ground infrastructures required by cable transportation systems are therefore very limited in urban environments where there is a relative lack of space on the ground. Furthermore, there is the need to minimize the downtime of these systems in urban areas. That is, unlike ski/mountain systems, in urban areas there are no high and low attendance seasons with long usage breaks where maintenance is possible. In particular, the components most subject to wear in these cable systems are the supporting cables and the hauling cable.

SUMMARY

Therefore, the object of the present disclosure is to provide a cable transportation system, which can overcome certain of the aforementioned drawbacks of certain of the prior art. In particular, one object of the present disclosure is to provide a cable transportation system, which can be used in urban areas and requires relatively less maintenance in general, as well as relatively less downtime for routine maintenance.

In accordance with these objects, according to its general definition, the present disclosure relates to a cable transportation system, such as a system whose layout has limited or absent elevation changes and possible curves in plan. For the purposes of the present disclosure, the cable system can also be a portion of a hybrid system, in which one section is configured as a cable system and another section as a rail system. Given these general premises, the cable system of the present disclosure is not equipped with a hauling cable and comprises:

a plurality of transporting units, such as in the form of cabins;
two supporting cables for each branch of the system, wherein the cables are configured for supporting the transporting units one after the other in a suspended configuration;
a plurality of trolleys, wherein each trolley supports a transporting unit in a suspended configuration and comprises rolls configured for resting and rolling on the supporting cables.

According to a first aspect of the disclosure, each trolley comprises at least one electric motor configured for moving the trolley along the supporting cables in the absence of a hauling cable.

Advantageously, according to this first aspect of the disclosure, the cable system does not have a hauling cable and the movement of the trolleys, hence of the cabins, is delegated to the at least one electric motor directly installed on the trolleys. The absence of the hauling cable enables the required maintenance interventions to be considerably reduced. Furthermore, these interventions no longer require stoppage of the whole system, but only the removal of the individual trolleys to be overhauled with the system in operation. The route without elevation changes in plan thus enables trolleys motorized by electric motors to be used relatively safely.

According to certain embodiments of the disclosure, the system comprises an electrical supply circuit configured to power the electric motor of the trolley, wherein this electrical supply circuit is particularly distributed along the entire path defined by the supporting cables. In this way, advantageously, the power supply is made available along the entire path defined by the supporting cables so as to always guarantee the correct power supply.

According to certain embodiments of the aforesaid electrical supply circuit, the supply of power to the at least one electric motor of the trolley occurs by power cables running parallel to the supporting cables, wherein these power cables cooperate with special pantograph socket devices, which extend spring-wise from the trolley against the power cables themselves. To prevent the power cables from being relatively far away from the trolley (i.e., at such a distance that the pantograph cannot correctly reach the respective power cable), the system comprises a plurality of supporting structures, or U-bolts, in the form of a bridge-shaped frame placed below the trolley and directly constrained to the supporting cables. In this embodiment, the tension and the diameter of the power supply cables are relatively well below the respective tension and diameter of the supporting cables by virtue of the different functions. As such, the power cable only acts as a conductor and therefore must only support its own weight, whereas the supporting cables must support the weight of the transporting units. In the absence of the aforementioned supporting structures, the power cables and the two supporting cables would take on a course with remarkably different vertical arrows, effectively preventing the trolley pantographs from remaining in contact with the power cables. Therefore, such a supporting structure comprises special supports for cables made of an electrically insulating material. The distance and the number of supporting structures in a span varies according to the conformation of the system, wherein one requirement of the supporting structures is to limit the distance variation with respect to the supporting cables, hence with respect to the trolley and its power sockets. These power sockets are mounted on pantographs to compensate for the variations in distance between the cables due to the different catenaries, and the dimensional features of the pantograph with related vertical displacements, and are closely related with the number and distance of the U-bolts, so as to guarantee a continuous contact between the trolley's power socket and the power cable independently of the exact relative position between the supporting cables and the power cables.

As an alternative to the power supply cables running along the track, at least one supply battery can be provided directly housed on the trolley for powering the electric motor. In one embodiment, one battery is provided for each electric motor.

In certain embodiments, each trolley comprises two front pairs and two rear pairs of rolls, wherein each roll is directly operated by a respective electric motor which also acts as a hub for said roll. In this case, the embodiment with the supply circuit provides the presence of at least two power cables for each branch of the track and two pantographs for each trolley.

In certain embodiments, the motorized rolls have an outer ring (i.e., the rolling groove), made of rubber or equivalent materials capable of offering adequate grip on the supporting cables and at the same time rolling wear resistance.

According to another aspect of the disclosure, which cooperates with the foregoing aspect in reducing maintenance interventions, but which can also be considered as an independently applicable aspect (and as such claimable both independently and in combination with the disclosure as described above), the system comprises a first terminal station (or upstream station) and a second terminal station (or downstream station) at which the supporting cables are looped back, thus providing a closed ring dual cable path for each branch. In order to loop back the two supporting cables, each terminal station comprises at least one pulley, such as one pulley for each supporting cable. A motorization, for example an auxiliary winch, is provided in at least one terminal station, the motorization being configured to selectively rotate the occurring pulley(s) so as to move the supporting cables along the track, if necessary. To this end, the supporting cables are therefore stranded, with such a shape as to also optimize the rolling of the trolley rolls. The motor for the rotation of the pulley(s) can also be provided at a single station, whereas at the opposite station it is possible to provide a device configured to tension the cable ring correctly.

Advantageously, this arrangement makes it possible to reduce the time required for the maintenance of the system with regard to the wear of the supporting cables at the shoe. That is, this wear requires periodic replacement of the section of the cable housed in the shoe. Therefore, an advantage of this system equipped with ring-type supporting cables is being able to move supporting cables in an automated way, by motorized pulleys and tensioning, almost without affecting the availability of the system to the public (for example, by performing the movements during the night-time shutdown).

On the contrary, a significant limitation in current system configurations equipped with supporting cables is the anchoring system of these cables, which occurs at the terminal stations at fixed drums. The sliding of the cable in these structures is a rather complex operation and requires several hours of work (or even a few days) during which the system is not available to the public.

Additional features are described in, and will be apparent from the following Detailed Description and the figures.

BRIEF DESCRIPTION OF THE DRAWINGS

Further features and advantages of the present disclosure will be apparent from the following description of a non-limiting embodiment thereof, with reference to the figures of the accompanying drawings, wherein:

FIG. 2 is a schematic plan view of a cable transportation system in which the present disclosure finds advantageous application;

FIG. 3 is an enlarged schematic view of the details indicated as III in FIG. 2;

DETAILED DESCRIPTION

Figure 1:
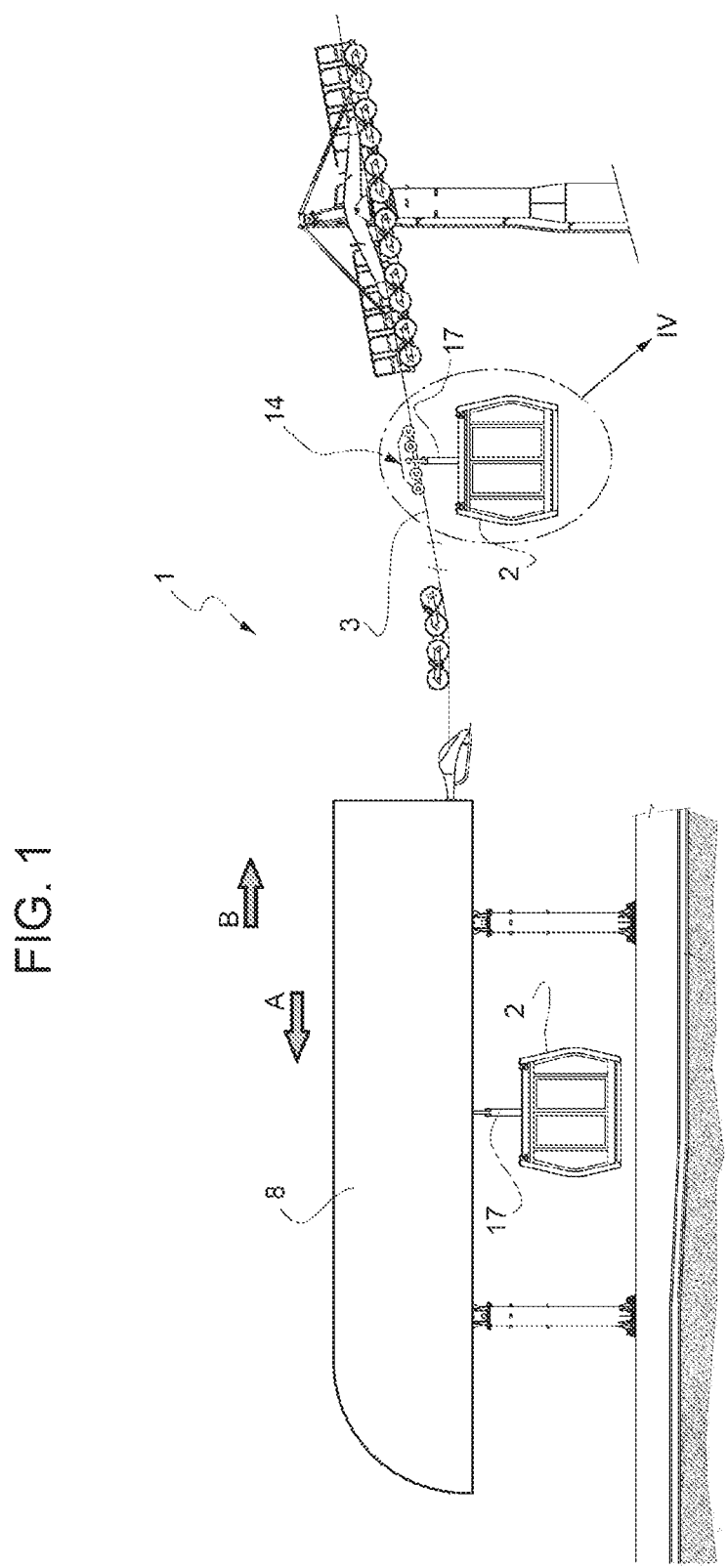
FIG. 1 is a schematic view of a portion of the cable transportation system.

Referring now to the example embodiments of the present disclosure illustrated in FIGS. 1 to 6 and specifically referring to FIG. 1, this figure schematically shows a portion of a cable transportation system indicated as a whole with the reference number 1. In particular, FIG. 1 shows a portion of a cable transportation system 1 comprising two supporting cables 3 (only one shown in FIG. 1) and a plurality of transporting units 2, such as in the form of cabins, which are moved along the route defined by the supporting cables 3. The transporting units 2 are fed in succession in a suspended configuration, that is raised from the ground and not resting on anything below. The cable transportation system comprises a plurality of stations at which passengers can enter or exit the cabins 2. FIG. 1 shows a first terminal station 8 into which the cabins 2 enter along direction A and exit along direction B after being returned inside the station. The system 1 comprises a second terminal station 9 (shown in FIG. 2) opposite the first 8, and optional intermediate passenger loading and unloading stations. As can be seen, each cabin 2 is connected to a respective trolley 4 configured to rest and roll on the supporting cables 3. The cabin 2 is kept suspended from the trolley 4 by a suspending arm 17 having one end coupled to the roof of the cabin 2 and the opposite end coupled to the trolley 4. In the station 8, the cabin 2 advances no longer supported by the cables 3, but on special tracks formed in the station 8 itself.

FIG. 2 is a schematic plan view of a cable transportation system in which the present disclosure finds advantageous application. In particular, such a cable transportation system 1 can be defined as an urban system in which there are relatively major curves in plan, but relatively minor, if any, elevation changes. This type of system makes the presence of the hauling cable unnecessary and enables the advance of the trolleys 4 along the supporting cables 3 to be delegated to other devices which will be described in detail with reference to FIGS. 4 to 6. The cable system 1 in FIG. 2 comprises a first terminal station 8 and an opposite terminal station 9, which are connected to each other by the supporting cables 3. Although not shown, intermediate stations and supporting structures for the cables 3, in particular masts at the top of which there are particular structures known in the field as shoes, may be present between the terminal stations 8 and 9.

According to one aspect of the disclosure, which, inter alia, can be considered independent of the remaining aspect of the disclosure related to the replacement of the pulling function of the hauling cable, the supporting cables 3 are looped back between the terminal stations 8 and 9 inside which special pulleys 18, 19 are provided. Therefore, the system 1 in FIG. 2 has two branches for the transporting units, each defined by two supporting cables 3 looped back into a closed ring between the terminal stations 8 and 9. FIG. 3 is an enlarged schematic view of the details indicated as III in FIG. 2. Said FIG. 3 shows in detail the terminal stations 8 and 9 and the related pulleys 18 and 19 configured to return the supporting cables 3. As can be seen, the system in FIG. 3 further comprises devices configured to selectively move the supporting cables 3 along the path in order to periodically place a section of the cables 3 in the area of the shoe (the supporting structure mentioned above), which section was not previously housed in this structure. It should be appreciated that in the area of the shoe, the supporting cables 3 receive relatively greater stresses and therefore the correct maintenance of the system requires periodic interventions aimed at placing unworn sections of the cable 3 into the shoe.

According to the present disclosure, maintenance can be carried out relatively safely and relatively quickly. According to the example in FIG. 3, the pulleys 19 are provided with a special motorization 20 which, when activated, rotates the pulleys 19 and therefore slides the supporting cables 3 along the path. Counterweights 21 configured to keep the cables 3 in the correct required pull are coupled at the station 8 opposite the pulleys 18. FIG. 3 further shows other elements which will be described in detail in the following figures and enable the trolley 4 to move on the cables 3 even in the absence of the hauling cable. In this example, the reference number 7 indicates power supply cables running along the track parallel to the supporting cables 3, and the reference number 13 indicates supporting structures configured to support the cables 7 mentioned above.

Figure 4:
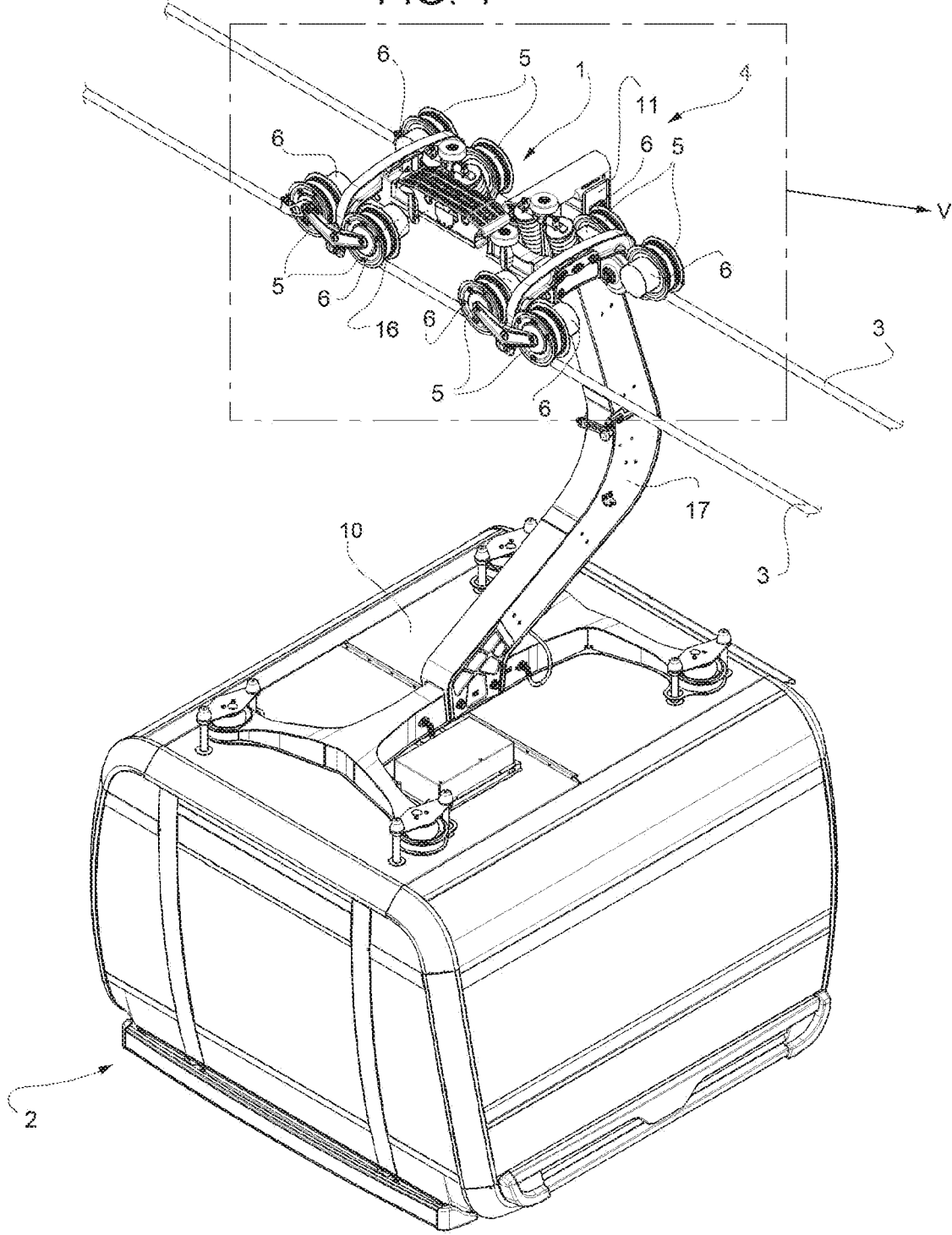
FIG. 4 is an enlarged schematic view of the detail indicated as IV in FIG. 1.

FIG. 4 shows an enlarged schematic view of the detail indicated as IV in FIG. 1. In particular, FIG. 4 shows a trolley 4 supporting a cabin 2, comprising a frame 16 provided with four pairs of rolls 5, two front pairs and two rear pairs, respectively. The trolley 4 has spring-type clamping elements and other rolls configured to guide the trolley 1 in the station 8. FIG. 4 also shows that the suspending arm 17 protruding from the roof 10 of the cabin 2 is coupled to the frame 16 by a support arm 11. As can be seen in FIG. 4, the cable transportation system 1 of the present disclosure includes no hauling cable. The trolley 4 is depicted with some elements that recall the classic vice usually found in similar trolleys for three-cable transportation systems (with two supporting cables and one hauling cable); however, according to the present disclosure, this trolley includes devices capable of making trolley advance on the supporting cables 3 even in the absence of the hauling cable.

Figure 5:
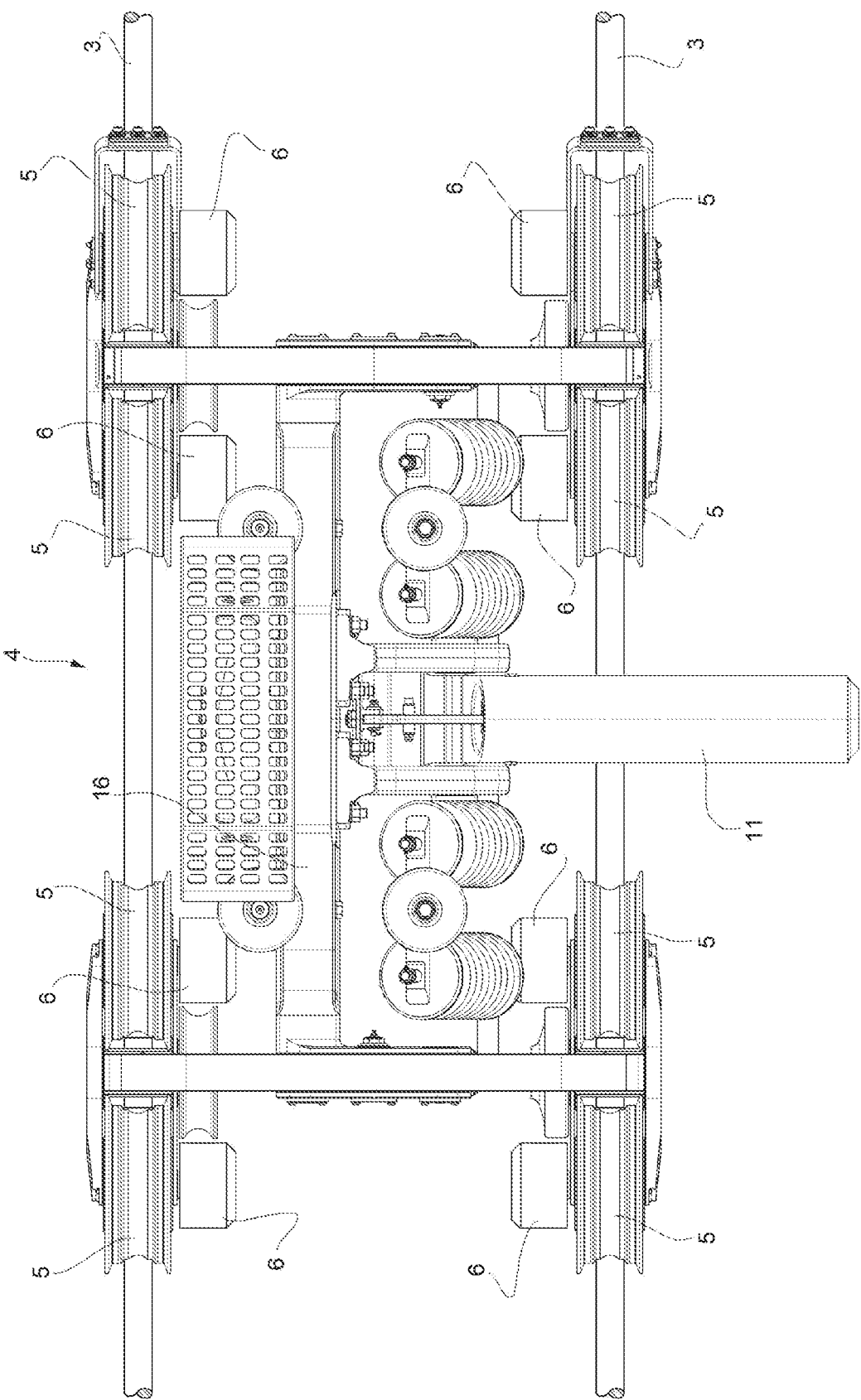
FIGS. 5 and 6 are schematic plan and front views, respectively, of the detail indicated as V in FIG. 4.
Figure 6:
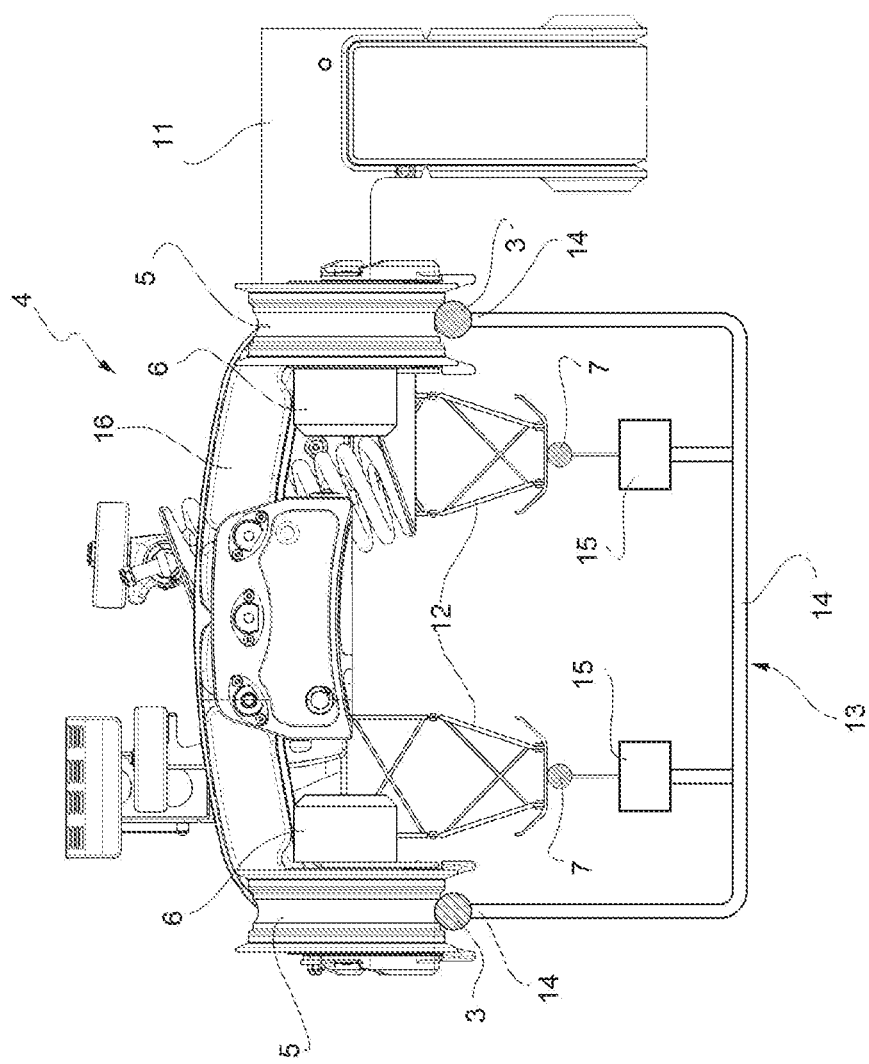

FIGS. 5 and 6 are plan and front views, respectively, of the trolley 4 in FIG. 4, which show the devices capable of making the trolley 4 advance on the supporting cables 3 even in the absence of the hauling cable. In particular, FIG. 5 shows that each roll 5 is equipped with an electric motor 6 for directly operating the rotation of the roll 5, wherein each electric motor 6 also acts as a hub for the respective roll 5. FIG. 6 shows another embodiment of the circuit supplying the electric motors 6. According to this example, the system 1 comprises two power supply cables 7 running along the whole track defined by the supporting cables 3. In order to electrically connect these cables 7 to the motors 6, the trolley 4 comprises two pantograph sockets 12, for example of the articulated quadrilateral type, which press spring-wise against the cables 7. The transmission of current through pantographs from power cables is known per se and therefore will not be further detailed. To always keep the cables 7 in a position where the pantographs 12 can contact them correctly, the system 1 of the present disclosure comprises a plurality of supporting structures 13 in the form of U-bolts constrained to the supporting cables 3 and configured to support the cables 7. As shown, each supporting structure 13 comprises a substantially U-shaped frame in which the free ends 14 of the parallel sides are coupled, for example clamped, to the supporting cables 3. The coupling between the free ends 14 of the supporting structure 13 and the supporting cables 3 enables the free passage of the trolley 4 on the supporting cables 3 without any interference between the rolls 5 and the supporting structure 13. As shown, the supporting structure 13 forms a sort of bridge connected to the supporting cables 3 on the opposite side with respect to the trolley 4. The bridge side 14 of the supporting structure 13 is provided with two supports or seats 15 projecting towards the trolley 4 and on which the cables 7 rest firmly. In order not to transmit current from the cables 7 to the supporting structure 13, hence to the supporting cables 3, the two supports 15 are made of an electrically insulating material.

Lastly, it is clear that modifications and variations may be made to the disclosure described herein without departing from the scope of the appended claims and without diminishing its intended technical scope. That is, various changes and modifications to the present embodiments described herein will be apparent to those skilled in the art and it is therefore intended that such changes and modifications be covered by the appended claims.

The invention is claimed as follows:

1. A cable transportation system comprising:
a transporting unit;
two supporting cables;
a trolley configured to support the transportation unit in a suspended configuration, the trolley including:
a plurality of rolls configured to rest and roll on the two supporting cables, and at least one electric motor configured to move the trolley along the two supporting cables; and
a power supply comprising a power cable extending along an entire path defined by the two supporting cables, wherein the trolley is associated with a pantograph socket configured to electrically couple the at least one electric motor and the power cable.

2. The cable transportation system of claim 1, wherein the power supply is configured to power the at least one electric motor of the trolley.

3. The cable transportation system of claim 1, wherein the trolley supports at least one supply battery configured to power the at least one electric motor.

4. The cable transportation system of claim 1, wherein at least one of the rolls of the trolley is associated with an electric motor configured to directly cause a rotation of that roll.

5. The cable transportation system of claim 4, wherein an outer surface of each roll in contact with the two supporting cables is made of rubber.

6. The cable transportation system of claim 1, further comprising a plurality of supporting structures constrained to the two supporting cables and configured to support the power cable.

7. The cable transportation system of claim 6, wherein each supporting structure comprises a bridge-shaped frame constrained to the two supporting cables on opposite sides with respect to the trolley.

8. The cable transportation system of claim 7, wherein a coupling between one of the supporting structure and the two supporting cables enables a passage of the trolley on the two supporting cables without any interference between the plurality of rolls and said supporting structure.

9. The cable transportation system of claim 7, wherein each supporting structure comprises at least one support for the power cable, the at least one support comprising an electrically insulating material.

* * * * *